United States Patent [19]

Hansen et al.

[11] 4,133,731

[45] Jan. 9, 1979

[54] RADIATION CURED, HIGH TEMPERATURE ADHESIVE COMPOSITION

[75] Inventors: David R. Hansen; David J. St. Clair, both of Houston, Tex.

[73] Assignee: Shell Oil Company, Houston, Tex.

[21] Appl. No.: 883,118

[22] Filed: Mar. 3, 1978

[51] Int. Cl.$^2$ .............................................. C08F 8/00
[52] U.S. Cl. ............................ 204/159.17; 204/159.2; 260/33.6 UA; 260/876 B; 428/461; 428/483; 428/508; 428/511; 428/515; 260/27 BB
[58] Field of Search ................................... 260/876 B; 204/159.2, 159.17

[56] References Cited

U.S. PATENT DOCUMENTS

| | | | |
|---|---|---|---|
| 3,113,912 | 12/1963 | Kraus | 204/159.2 |
| 3,936,365 | 2/1976 | Saunders et al. | 204/159.2 |
| 4,006,024 | 2/1977 | Ibata et al. | 96/115 R |
| 4,076,768 | 2/1978 | Saunders et al. | 260/876 B |

Primary Examiner—Richard B. Turer
Attorney, Agent, or Firm—Dean F. Vance

[57] ABSTRACT

A cured adhesive composition possessing excellent cohesive strength at high temperatures along with excellent adhesion, shear strength and solvent resistance is prepared by the radiation initiated curing of an adhesive composition comprising a monoalkenyl arene/conjugated diene block copolymer, tackifying resin and a di-to-tetra-functional acrylate or methacrylate selected from the group consisting of acrylic and methacrylic acid esters of polyols.

12 Claims, 4 Drawing Figures

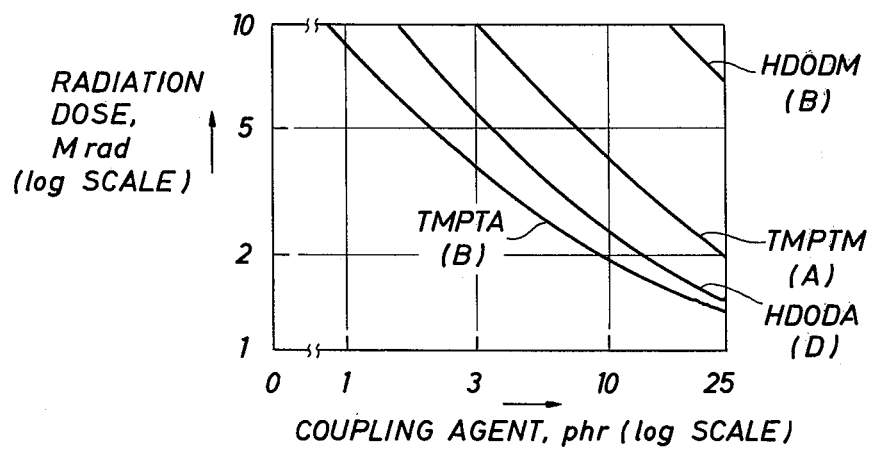
FIG. 1 EFFECT OF COUPLING AGENT
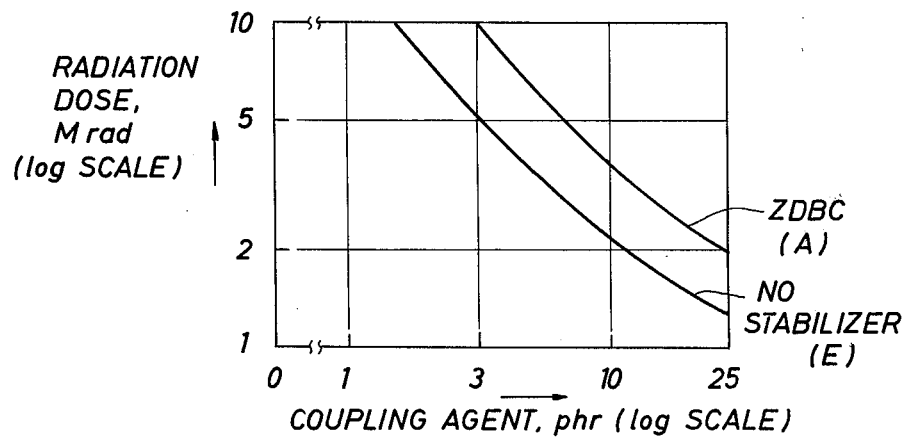
FIG. 2 EFFECT OF STABILIZER

FIG.3 EFFECT OF POLYMER TYPE
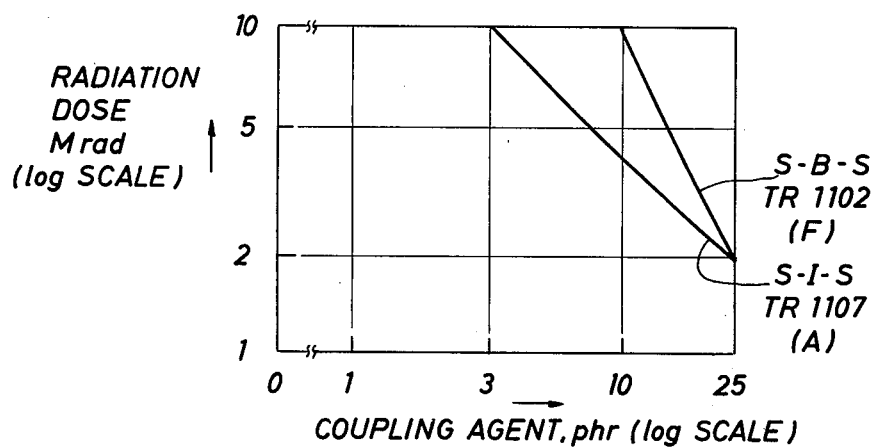
FIG.4 EFFECT OF NUMBER OF S-I ARMS
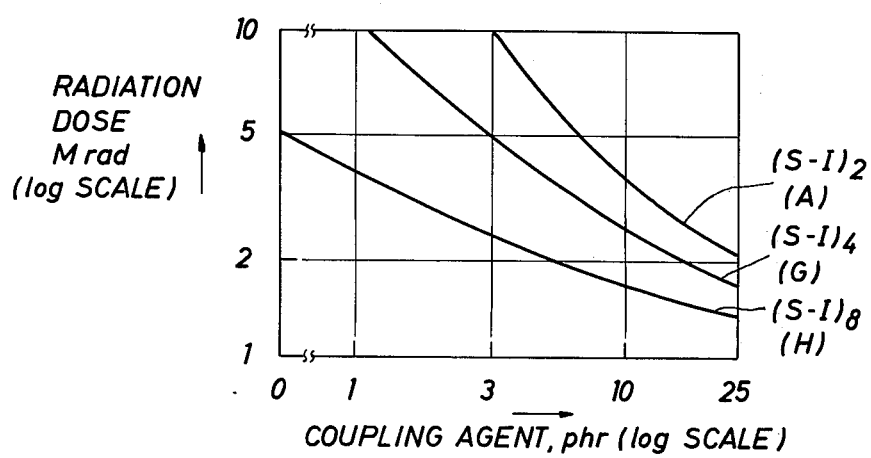

RADIATION CURED, HIGH TEMPERATURE ADHESIVE COMPOSITION

BACKGROUND OF THE INVENTION

Styrene-diene block copolymers have been formulated in the past to produce a number of types of adhesive compositions. The basic patent in this field, Harlan, U.S. Pat. No. 3,239,478, shows combinations of these block copolymers with tackifying resins and paraffinic extending oils to produce a wide spectrum of adhesives. However, two serious limitations of these adhesive compositions are their relatively low service temperatures and their poor solvent resistance. Generally, the highest temperature at which these styrene-diene block copolymers retain useful properties and act like a vulcanized rubber is limited by the softening temperature (Tg) of the styrene end block. Depending upon the molecular weight of the end blocks and the load, these block copolymers can begin to significantly creep or flow at 120°–180° F. Although these adhesives can withstand very short contact with common solvents, prolonged contact with aromatic solvents or blends containing aromatic, ester or lactone solvent will cause these adhesives to soften and lose adhesive strength. For a number of applications it would be very advantageous to have higher service temperatures. For example, these adhesives would be useful in paint shops if the masking tapes produced had solvent resistance and a 225°–250° F. service temperature. They would also be useful as laminating adhesives in, for example, retortable food pouches if they could withstand boiling water temperatures and in furniture laminating adhesives if they could bear moderate loads at 250° F.

One means to improve the service temperature of these styrene-diene block copolymer adhesive compositions is to chemically cure the adhesive with a phenol formaldehyde resin and heat as disclosed in Korpman, U.S. Pat. No. 3,625,752. However, this procedure is undesirable because it is a very energy intensive process to heat the adhesive. Also, this process cannot be used on heat sensitive backing such as plastics because the backing melts at the temperatures required to cure the adhesive. A more energy efficient process is the radiation initiated cure disclosed in Hendricks, U.S. Pat. No. 2,956,904. Compositions disclosed, however, did not contain a supplemental crosslink promoting ingredient and therefore, as will be shown here, higher radiation doses were required.

A new adhesive composition that can be easily cured has now been found.

SUMMARY OF THE INVENTION

The present invention broadly encompasses a cured adhesive composition possessing excellent high temperature cohesive strength along with excellent adhesion, shear strength and solvent resistance. The adhesive is prepared by the high energy radiation, especially electron beam or ultraviolet initiated curing of an adhesive composition comprising:

(a) 100 parts by weight of a block copolymer having at least two monoalkenyl arene polymer end blocks A and at least one elastomeric conjugated diene mid block B, said blocks A comprising 8–55% by weight of the block copolymer;

(b) about 25 to about 250 parts by weight of an adhesion-promoting resin compatible with block B; and (c) about 1 to about 50 parts by weight of a di- to tetrafunctional acrylate or methacrylate selected from the group consisting of the acrylic and methacrylic acid esters of polyols.

Additional components may be present in the composition including, among others, plasticizers such as rubber compounding oils or liquid resins, antioxidants, and end block (A) compatible resins.

DETAILED DESCRIPTION OF THE INVENTION

The block copolymers employed in the present composition are thermoplastic elastomers and have at least two monoalkenyl arene polymer end blocks A and at least one elastomeric conjugated diene polymer mid block B. The number of blocks in the block copolymer is not of special importance and the macromolecular configuration may be linear, graft, radial or star depending upon the method by which the block copolymer is formed. Typical block copolymers of the most simple configuration would have the structure polystyrene-polyisoprene-polystyrene and polystyrene-polybutadiene-polystyrene. A typical radial or star polymer would comprise one in which the diene block has three to four branches (radial) or five or more branches (star), the tip of each branch being connected to a polystyrene block. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is isoprene.

The average molecular weights of each of the blocks may be varied as desired. The monoalkenyl arene polymer blocks preferably have average molecular weights between about 5,000 and 125,000, more preferably between about 7,000 and about 50,000. The elastomeric conjugated diene polymer blocks preferably have average molecular weights between about 15,000 and about 250,000, more preferably between about 25,000 and about 150,000. The average molecular weights of the polystyrene end blocks are determined by gel permeation chromatography, whereas the polystyrene content of the polymer is measured by infrared spectroscopy of the finished block polymer. The weight percentage of the thermoplastic monoalkenyl arene blocks in the finished block polymer should be between about 8 and 55%, preferably between about 10% and about 30% by weight. The general type and preparation of these block copolymers are described in U.S. Pat. No. 28,246 and in many other U.S. and foreign patents.

The block copolymer by itself lacks the required adhesion. Therefore, it is necessary to add an adhesion promoting or tackifying resin that is compatible with the elastomeric conjugated diene block. A much preferred tackifying resin is a diene-olefin copolymer of piperylene and 2-methyl-2-butene having a softening point of about 95° C. This resin is available commercially under the tradename Wingtack 95, and is prepared by the cationic polymerization of 60% piperylene, 10% isoprene, 5% cyclopentadiene, 15% 2-methyl butene and about 10% dimer. See U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C. Other adhesion promoting resins which are also useful in the compositions of this invention include hydrogenated resins, esters of rosins, polyterpenes, terpenephenol resins, and polymerized mixed olefins.

The amount of adhesion promoting resin employed varies from about 25 to about 200 parts by weight per hundred parts rubber (phr), preferably, between about 50 to about 150 phr.

The adhesive compositions of the instant invention also may contain plasticizers such as rubber extending or compounding oils or liquid resins. These rubber compounding oils are well-known in the art and include both high saturates content and high aromatics content oils. The amount of rubber compounding oil employed varies from 0 to about 100 phr, preferably about 10 to about 60 phr.

Optionally, an arene-block-compatible resin may be employed. Compatibility is judged by the method disclosed in U.S. Pat. No. 3,917,607. Normally, the resin should have a softening point above about 100° C., as described by ASTM method E 28, using a ring and ball apparatus. Mixtures of arene-block-compatible resins having high and low softening points may also be used. Useful resins include coumarone-indene resins, polystyrene resins, vinyl toluene-alphamethylstyrene copolymers, and polyindene resins. Much preferred is a coumarone-indene resin. The amount of arene-block-compatible resin varies from 0 to about 200 phr.

An essential component of the present invention is the di-to tetra-functional acrylate or methacrylate coupling agent which promotes crosslinking of the block copolymer durind exposure to the radiation. The coupling agents employed herein are di-, tri-, and tetra-functional acrylates and methacrylates selected from the group consisting of the acrylic and methacrylic acid esters of polyols. Preferred coupling agents include 1,6-hexane diol diacrylate (HDODA), 1,6-hexane diol dimethacrylate (HDODM), trimethylolpropane triacrylate (TMPTA), trimethylolpropane trimethacrylate (TMPTM), pentaerythritol tetracrylate (PTA), and pentaerythritol tetramethacrylate (PTM). Other useful acrylates and methacrylates include pentaerythritol triacrylate, dipentaerythritol monohydroxy penta/acrylate, 1,3-butylene glycol diacrylate, 1,4-butene diol diacrylate, 2,2-diemthyl propane 1,3-diacrylate (neopentyl glycol diacrylate), diethylene glycol diacrylate, tetraethylene glycol diacrylate, polyethylene glycol diacrylate, diallyl fumarate, allyl methacrylate, 1,3-butylene glycol dimethacrylate, ethylene glycol dimethacrylate, diethylene glycol dimethacrylate, triethylene glycol dimethacrylate, tetraethylene glycol dimethacrylate, polyethylene glycol dimethacrylate, and ethoxylated bisphenol A dimethacrylate. Much preferred coupling agents are TMPTA and TMPTM with TMPTM being the most preferred. The amount of coupling agent employed varies from about 1 phr to about 50 phr, preferably about 2 phr to about 25 phr.

The compositions of this invention may be modified with supplementary materials including pigments, fillers, and the like as well as stabilizers and oxidation inhibitors.

The adhesive compositions of the present invention may be applied to the substrate from a solution of up to about 40% weight solids of the ingredients in a solvent such as toluene, the solvent being removed by evaporation prior to crosslinking by exposure to the radiation. Alternatively, the ingredients may be mixed in a solvent, the mixture may be emulsified and the solvent evaporated, and the adhesive may be applied to the substrate as a 60–70% weight solids water-based emulsion, the water being removed by evaporation prior to crosslinking. Adhesives of the present invention are especially suited for preparation as 100% solids hot melt adhesives since they give relatively low processing viscosities, less than several hundred thousand centipoise, and adequate pot live, up to several hours, at processing temperatures of about 150° C. A preferred method for processing these adhesives to minimize gel formation during hot melt processing is to use an extruder to mix the adhesive and feed the coating die as is disclosed in Korpman U.S. Pat. No. 3,984,509.

The compositions of the present invention are cured by exposure to high energy radiation such as electron beam radiation or ultraviolet radiation, with electron beam being preferred.

The electron beam radiation or high energy ionizing radiation which is employed to effect the crosslinking reaction can be obtained from any suitable source such as an atomic pile, a resonant transformer accelerator, a Van de Graaf electron accelerator, a Linac electron accelerator, a betatron, a synchrotron, a cyclotron, or the like. Radiation from these sources will produce ionizing radiation such as electrons, protrons, neutrons, deuterons, gamma rays, X rays, alpha particles, and beta particles.

The crosslinking reaction is conveniently effected at room temperature, but it can be conducted at depressed or elevated temperatures if desired. It is also within the spirit and scope of the invention to effect the crosslinking reaction within the confines of an inert atmosphere to prevent oxidative degradation of the block copolymer.

The amount of radiation required depends primarily upon the type and concentration of acrylate or methacrylate employed and the level of curing desired. Suitable doses of electron beam radiation include 1 megarad to about 20 megarads, preferably about 2 megarads to about 10 megarads. Suitable UV radiation doses are those received by a 1.5 mil thick adhesive passing under a medium pressure mercury lamp rated at 200 watts per inch at line speeds of about 10 to about 800 feet per minute, the preferred range being 25 to 400 feet per minute.

When using ultraviolet radiation it is necessary to employ a photosensitizer in order to speed up the crosslinking reaction. Useful photosensitizers are benzophenone, propiophenone, cyclopropyl phenyl ketone, acetophenone, 1.3.5-triacetyl benzene, benzaldehyde, thioxanthane, authraquinone, beta-naphthyl phenyl ketone, beta-naphthaldehyde, beta-acetonaphthone, 2.3-pentanedione, benzil, fluoronone, pyrene, benzanthrone, and anthracene. While most of these are well-known photosensitizers, other photosensitizers, responsive to UV radiation, would work equally well in the present invention. The present invention is not to be limited to specific photosensitizers, since the many known photosensitizers tested have all tended to work essentially equally well.

A preferred use of the present formulation is in the preparation of pressure-sensitive adhesive tapes or in the manufacture of labels. The pressure-sensitive adhesive tape comprises a flexible backing sheet and a layer of the adhesive composition of the instant invention coated on one major surface of the backing sheet. The backing sheet may be a plastic film, paper or any other suitable material and the tape may include various other layers or coatings, such as primers, release coatings and the like, which are used in the manufacture of pressure-sensitive adhesive tapes.

The invention is further illustrated by means of the following illustrative embodiments, which are given for the purpose of illustration alone and are not meant to limit the invention to the particular reactants and amounts disclosed.

The high temperature cohesive strength of the irradiated adhesive compositions was measured by a Strippability Temperature Limit (STL) test. STL is defined as the maximum temperature at which a tape can be rapidly peeled from a hot, stainless steel substrate without leaving an adhesive residue on the panel. The test is run by applying a quarter inch wide strip of tape to a stainless steel panel whose temperature is controlled to give a temperature gradient of about 30° F. per inch between 100° F. and 450° F. Following a 30 second warmup, the tape is stripped off manually at high speed and at approximately a 90° angle. The equipment used is a Heizbank type 184321 melting point tester from the Reichert Company, Vienna, Austria. The temperature at which massive cohesive failure occurs is recorded as the STL value in all following tables. The STL test measures whether an automotive masking tape can be removed cleanly when it is stripped from a painted car as it leaves the paint baking ovens. Solvent resistance is determined by immersing about 1 square inch of tape in toluene for about 24 hours. If the adhesive dissolves, solvent resistance is poor. If it only swells, solvent resistance is good.

In all embodiments, the adhesive composition was prepared in a toluene solution and applied as about a 1.5 mil dry adhesive layer to a 1 mil Mylar substrate. Electron beam irradiation was accomplished using an 18 inch wide ELECTROCURTAIN® PROCESSOR manufactured by Energy Sciences, Inc. Ultraviolet irradiation was accomplished using a UV Processor (QC 1202 N/A) supplied by Radiation Polymer Co. This unit has two medium pressure mercury lamps, each rated at 200 watts per inch.

The adhesive compositions used in Illustrative Embodiments I-V are shown in Table 1. The polystyrene-polyisoprene-polystyrene block copolymers tested were Shell's KRATON® 1107 Rubber, a linear (S-I)$_2$ polymer, Phillips' Solprene 421, a radial (S-I)$_4$ polymer and an experimental star (S-I)$_8$ polymer. All three polymers had about the same S-I molecular weights prior to coupling and all three are about 15%w styrene. The polystyrene-polybutadiene-polystyrene polymer tested was Shell's KRATON 1102 Rubber, a linear (S-B)$_2$ polymer of 30% styrene. The adhesion promoting tackifying resins used with the (S-I)$_n$ polymers and (S-B)$_2$ polymer were Goodyear's Wingtack 95 Resin, a diene-olefin resin, and Hercules' XPS 502 Resin, a modified terpene hydrocarbon resin, respectively. The plasticizer used in Formulation I was Shell's SHELLFLEX® 371, a low aromatic content process oil. The stabilizer used in all except Formulation E was zinc dibutyldithiocarbamate.

Table I

| Formulation | A | B | C | E | F | G | H | I |
|---|---|---|---|---|---|---|---|---|
| Polymer | | | | | | | | |
| KRATON® 1107 Rubber, (S-I)$_2$ | 100 | 100 | 100 | 100 | 100 | | | 100 |
| KRATON 1102 Rubber, (S-B)$_2$ | | | | | | 100 | | |
| Solprene 421, (S-I)$_4$ | | | | | | | 100 | |
| Experimental Star, (S-I)$_8$ | | | | | | | | 100 |
| Resin | | | | | | | | |
| Wingtack 95 | 80 | 80 | 80 | 80 | 80 | | 80 | 80 | 100 |
| XPS-502 | | | | | | 80 | | | |
| Plasticizer | | | | | | | | |
| SHELLFLEX® 371 | | | | | | | | 25 |
| Stabilizer | | | | | | | | |
| Butyl Zimate | 2 | 2 | 2 | 2 | | 2 | 2 | 2 | 2 |
| Multifunctional Coupling Agent[a] | | | | | | | | |
| TMPTM | Vary | | | | Vary | Vary | Vary | Vary | Vary |
| TMPTA | | Vary | | | | | | |
| HDODM | | | Vary | | | | | |
| HDODA | | | | Vary | | | | |

[a] Coupling agents obtained from Sartomer. Concentrations vary from 0–25 phr.
TMPTM: Trimethylolpropane trimethacrylate
TMPTA: Trimethylolpropane triacrylate
HDODM: 1,6-Hexanediol dimethacrylate
HDODA: 1,6-Hexanediol diacrylate In Illustrative Embodiments I-V, adhesives were irradiated with electron beam radiation at doses of 0, 1, 2, 5 and 10 megarads (mrad). With ELECTROCURTAIN equipment, radiation doses of 1, 2, 5 and 10 mrad are equivalent to curing line speeds of about 700, 350, 120 and 70 feet per minute, respectively. Each of the formulations in Table 1 was tested at five levels (0, 1, 3, 10 and 25 phr) of coupling agent. Results were analyzed in terms of contour diagrams of STL on a grid of radiation dose vs. coupling agent concentration. An STL value of >400° F. was considered to indicate a satisfactory degree of crosslinking. Contour lines on FIGS. 1–4 in Illustrative Embodiments I-V indicate combinations of radiation dose and coupling agent concentration which give an acceptable degree of crosslinking. To the left of these contour lines, there was little if any improvement in STL and solvent resistance was poor. To the right of these lines, STL was >400° F. and the adhesive would not dissolve in toluene.

ILLUSTRATIVE EMBODIMENT I

Illustrative Embodiment I shows the effect of irradiation in air versus irradiation in nitrogen. Irradiation of Formulation A containing TMPTM was done with and without a nitrogen blanket. When irradiation was done under nitrogen, acceptable STL values were found, as shown in FIG. 1, for combinations ranging from 10 megarad dose on the adhesive containing 3 phr of TMPTM to two megarad dose on the adhesive containing 25 phr of TMPTM. When irradiation was done in air, no significant improvement in STL was found at doses as high as 10 megarads on the adhesive containing as much as 25 phr of TMPTM. Thus, an inert gas blanket was required to achieve crosslinking. In all further experiments discussed here, irradiation was done under a nitrogen blanket.

ILLUSTRATIVE EMBODIMENT II

In this Embodiment the effect of the choice of multifunctional coupling agent (MFC) is shown. Four MFC's were evaluated for their effectiveness in crosslinking as PSA: two difunctional MFC's, an acrylate (HDODA) and a methacrylate (HDODM), and two trifunctional MFC's, an acrylate (TMPTA) and a methacrylate (TMPTM). Results in FIG. 1 show that both acrylates crosslink the adhesive more readily than do the methacrylates. That is, a lower radiation dose is required at a given MFC concentration or a lower MFC concentration is required at a given radiation dose. Although the multifunctional acrylates and more effective than the multifunctional methacrylates, they are also more toxic.

ILLUSTRATIVE EMBODIMENT III

Illustrative Embodiment III shows the effect of a stabilizer. Results in FIG. 2 show that the stabilizer, zinc dibutyldithiocarbamate, included in the adhesive, makes crosslinking more difficult. It is expected that the type and concentration of stabilizer used in the adhesive would undoubtedly affect the rate of crosslinking. However, no work has yet been done to develop a more suitable stabilizer.

ILLUSTRATIVE EMBODIMENT IV

Illustrative Embodiment IV shows the effect of block polymer structure on the rate of cure. Results in FIG. 3 comparing Formulations A and F show that an adhesive based on either an S-I-S or an S-B-S polymer can be electron cured. The S-I-S based adhesive crosslinked somewhat more readily than did the S-B-S based adhesive. Results in FIG. 4 comparing Formulations A, G and H which are based on a linear $(S-I)_2$, a radial $(S-I)_4$ and a star $(S-I)_8$ coupled polymer, respectively, show that as the number of S-I arms on the polymer used in the adhesive increases, the adhesive can be more readily crosslinked.

ILLUSTRATIVE EMBODIMENT V

Illustrative Embodiment V shows the effect of including a plasticizer in the adhesive. Crosslinking studies on Formulation I in Table 1 showed that its crosslinking characteristics are the same as those of Formulation A shown in FIG. 1. That is, the plasticizer did not appreciably slow down the rate of cure. Thus, an adhesive having equivalent crosslinking performance but lower raw material costs was prepared by including a plasticizer.

ILLUSTRATIVE EMBODIMENT VI

Illustrative Embodiment VI demonstrates the suitability of ultraviolet radiation for initiation of crosslinking. The formulations and results are shown in Table 2. All three formulations, the control (Formulation A) and the two examples of the type disclosed in this patent (Formulations B and C), show poor STL and dissolve in toluene before exposure to UV radiation. After exposure to UV radiation, the control sample shows some improvement in STL but its solvent resistance remains poor and it shows very poor shear adhesion. Formulations B and C, however, show good STL and solvent resistance as well as good shear adhesion.

Table 2

| Formulations Crosslinked with Ultraviolet Radiation | | | |
|---|---|---|---|
| Formulation, phr | A | B | C |
| KRATON ® 1107 Rubber | 100 | 100 | 100 |
| Wingtack 95 | 80 | 80 | 80 |
| TMPTM | | 25 | |
| TMPTA | | | 25 |
| DEAP (diethoxyacetophenane) | | 3 | 3 |
| Properties before UV exposure | | | |
| Strippability Temperature Limit, °F | 230 | 200 | <120 |
| Solvent Resistance | Poor | Poor | Poor |
| Polyken Probe Tack[a], Kg | 1.0 | 0.7 | 0.4 |
| Shear Adhesion[b], minutes | >4000 | <1 | <1 |
| Properties after UV Exposure[c] | | | |
| Strippability Temperature Limit, °F | 310 | >400 | >400 |
| Solvent Resistance | Poor | Good | Excellent |
| Polyken Probe Tack, Kg | 0.9 | 0.6 | 0.3 |
| Shear Adhesion, minutes | 3 | >3000 | >4000 |

[a]ASTM D-2979
[b]PSTC Method No. 7, ¼ × ¼ inch contact to steel, 2 Kg load
[c]One pass under two UV lamps at 100 feet per minute

ILLUSTRATIVE EMBODIMENT VII

Another preferred application of the compositions disclosed here is as adhesives for laminating dissimilar films, for example, plastic to plastic and plastic to paper or metal foil. Illustrative Embodiment VII demonstrates the feasability of this application. As shown in Table 3, films laminated with an uncrosslinked adhesive have limited upper service temperature limits. When laminated with an adhesive of the type disclosed here and crosslinked by exposure to UV radiation, the upper service temperature of the laminate is increased by as much as 115° F. over the service temperature with the uncrosslinked adhesive. In the example shown in Table 3, the UV radiation which reached the adhesive is only that which passed through the Mylar side of the laminate. A UV absorption spectrum run on the Mylar film showed that the Mylar absorbs most of the UV radiation of wavelength less than 3100 A. Thus, even better properties (higher failure temperatures and faster rates of cure) can be expected for UV crosslinked samples if a more UV transparent plastic (such as cellophane which transmits most light of wavelength greater than 2500 A) is used in the laminate or if crosslinking is accomplished by irradiation with the more penetrating electron beam radiation.

Table 3

| Laminating Adhesives Crosslinked with UV Radiation | | |
|---|---|---|
| | Failure Temperature[a], °F | |
| Laminate | Uncrosslinked[b] | Crosslinked[c] |
| Mylar to Mylar | 235 | 320 |
| Mylar to Polypropylene | 210 | 240 |
| Mylar to Cellophane | 235 | 325 |
| Mylar to Kraft Paper | 140 | 255 |
| Mylar to Aluminum Foil | 235 | 320 |

[a]Temperature at which a 1" × 1" lap shear bond fails under a 1 Kg load when placed in an oven whose temperature is raised at 40° F/hour.
[b]Laminating adhesive formulation was KRATON 1107 Rubber, 80 phr of Wingtack 95, 2 phr of Butyl Zimate.
[c]Laminating adhesive formulation was KRATON 1107 Rubber, 80 phr of Wingtack 95, 25 phr TMPTA, 2 phr DEAP, 2 phr Butyl Zimate. Crosslinking was accomplished by irradiating the laminate through the Mylar at a line speed of 25 feet per minute.

We claim as our invention:
1. An adhesive composition possessing good solvent resistance and high temperature cohesive strength prepared by the radiation curing of an adhesive composi- tion in an inert atmosphere, said adhesive composition comprising:
(a) 100 parts by weight of a block copolymer having at least two monoalkenyl arene polymer end blocks A and at least one elastomeric conjugated diene mid block B, said block A comprising 8–55% by weight of the block copolymer;
(b) about 25 to about 200 parts by weight of a tackifying resin compatible with block B; and
(c) about 1 to about 50 parts by weight of a di-to tetrafunctional acrylate or methacrylate selected from the group consisting of the acrylic and methacrylate acid esters of polyols.

2. A composition according to claim 1 wherein the type of radiation cure is electron beam irradiation.

3. A composition according to claim 1 wherein the type of radiation cure is ultraviolet irradiation.

4. A composition according to claim 3 also including a photosensitizer.

5. A composition according to claim 1 wherein said acrylate or methacrylate is selected from the group consisting of 1,6-hexane diol diacrylate, 1,6-hexane diol dimethacrylate, trimethylolpropane triacrylate, trimethylolpropane trimethacrylate, pentaerythritol tetracrylate, and pentaerythritol tetramethacrylate.

6. A composition according to claim 5 wherein said methacrylate is trimethyolpropane trimethacrylate.

7. A composition according to claim 1 wherein said block copolymer is a linear polystyrene-polyisoprene-polystyrene block copolymer.

8. A composition according to claim 1 wherein said block copolymer is a radial polystyrene/polyisoprene block copolymer.

9. A composition according to claim 1 wherein said block copolymer is a star-shaped polystyrene/polyisoprene block copolymer.

10. A composition according to claim 2 wherein the amount of radiation employed is between about 1 and about 50 megarads.

11. A composition according to claim 10 wherein the amount of radiation employed is between about 2 and about 25 megarads.

12. A composition according to claim 11 wherein the amount of acrylate or methacrylate employed is between about 2 and about 25 parts by weight.

* * * * *